(12) United States Patent
Johnson

(10) Patent No.: US 12,349,616 B2
(45) Date of Patent: Jul. 8, 2025

(54) IMPLEMENT AUTOMATION SYSTEM

(71) Applicant: Kubota Corporation, Osaka (JP)

(72) Inventor: Gerald Ray Johnson, Newton, KS (US)

(73) Assignee: Kubota Corporation, Osaka (JP)

( * ) Notice: Subject to any disclaimer, the term of this patent is extended or adjusted under 35 U.S.C. 154(b) by 43 days.

(21) Appl. No.: 18/543,163

(22) Filed: Dec. 18, 2023

(65) Prior Publication Data

US 2024/0231385 A1 Jul. 11, 2024

Related U.S. Application Data

(60) Provisional application No. 63/437,895, filed on Jan. 9, 2023.

(51) Int. Cl.

| | |
|---|---|
| *A01B 69/04* | (2006.01) |
| *G05D 1/622* | (2024.01) |
| *G05D 1/644* | (2024.01) |
| *G05D 1/646* | (2024.01) |
| *G05D 1/648* | (2024.01) |
| *G05D 1/672* | (2024.01) |
| *G05D 105/05* | (2024.01) |
| *G05D 105/15* | (2024.01) |

(52) U.S. Cl.
CPC ........... *A01B 69/008* (2013.01); *G05D 1/622* (2024.01); *G05D 1/644* (2024.01); *G05D 1/646* (2024.01); *G05D 1/648* (2024.01); *G05D 1/672* (2024.01); *G05D 2105/05* (2024.01); *G05D 2105/15* (2024.01)

(58) Field of Classification Search
None
See application file for complete search history.

(56) References Cited

U.S. PATENT DOCUMENTS

| | | |
|---|---|---|
| 8,437,901 B2 | 5/2013 | Anderson |
| 8,639,408 B2 | 1/2014 | Anderson |
| 10,197,407 B2 | 2/2019 | Mouthaan et al. |
| 11,300,976 B2 | 4/2022 | Tomita et al. |
| 11,429,099 B2 | 8/2022 | Smith et al. |

(Continued)

FOREIGN PATENT DOCUMENTS

| | | |
|---|---|---|
| EP | 3451813 B1 | 10/2020 |
| JP | 6621724 B2 | 12/2019 |

(Continued)

OTHER PUBLICATIONS

PCT International Searching Authority Notice of Invitation to Pay Additional Fees, PCT Application No. PCT/JP2024/000057, mailed Feb. 6, 2024, 7 pages, Japan Patent Office, Tokyo, Japan.

*Primary Examiner* — Peter D Nolan
*Assistant Examiner* — Michael F Whalen
(74) *Attorney, Agent, or Firm* — Hitchcock Evert LLP

(57) ABSTRACT

An automated operational and mission planning system for power unit and implement operations. The system generating connection profiles based on power unit profiles and implement profiles to facilitate operational controls for a combined machine system. The mission planning system generating plans for selected projects using implement-based operation instructions. The operational system onboard the power unit executing mission plan with connection profile adjustments to drive implement operation.

12 Claims, 8 Drawing Sheets

(56) References Cited

U.S. PATENT DOCUMENTS

| | | |
|---|---|---|
| 2010/0057511 A1 | 3/2010 | Mansouri et al. |
| 2014/0371979 A1 | 12/2014 | Drew et al. |
| 2015/0296701 A1* | 10/2015 | Anderson .............. A01B 71/08 172/430 |
| 2017/0200393 A1* | 7/2017 | Ferrari ................. A01B 79/005 |
| 2020/0159220 A1 | 5/2020 | Hurd et al. |
| 2020/0309196 A1 | 10/2020 | Morris et al. |
| 2021/0203573 A1 | 7/2021 | Miura et al. |
| 2021/0339768 A1* | 11/2021 | Kakkar ................ G05D 1/6484 |
| 2022/0035029 A1 | 2/2022 | Wang et al. |
| 2022/0078960 A1 | 3/2022 | Okura et al. |
| 2022/0095526 A1 | 3/2022 | Shen et al. |
| 2024/0188477 A1* | 6/2024 | Umlauf ................. A01B 71/06 |

FOREIGN PATENT DOCUMENTS

| | | |
|---|---|---|
| JP | 6860640 B2 | 4/2021 |
| JP | 7138210 B2 | 9/2022 |
| WO | 2016076320 A1 | 5/2016 |
| WO | 2018142899 A1 | 8/2018 |

* cited by examiner

IMPLEMENT AUTOMATION SYSTEM

CROSS-REFERENCE TO RELATED APPLICATIONS

This application claims the benefit of priority from U.S. Provisional Patent Application No. 63/437,895 filed on Jan. 9, 2023, which is incorporated herein by reference.

FIELD OF THE DISCLOSURE

The invention relates generally to automated vehicle and machine activities using implements.

BACKGROUND

Autonomous machines exist within the off-highway or other off-road machinery spaces (e.g., agriculture, turf, construction, and mining) that involve a machine working on a task autonomously or in a semi-autonomous manner with human oversight. Machine automation systems (e.g., vehicle automation systems) use an onboard operations system to drive and manage the machine (e.g., the vehicle). The system may also include onboard sensors to identify potential obstacles and provide feedback for driving and operating the machine.

Machine automation has been applied to operations within fields or specific job sites, including pre-planned lines to traverse a field that may include waypoints or boundary markers. In some embodiments, systems have assisted in identifying turns and headland operations to manage transitions between operation paths, such as parallel mowing lines. Machine automation is designed for a given project operation for the specified field.

For machine systems that include a power unit and implement, the machine automation and planning has been tailored for each combined machine system. The system receives a selection of an existing machine system. Mission plans provide control instructions pre-configured for the specific machine system based on mission instructions for the specific machine system.

SUMMARY

The automation planning and operations do not facilitate variable development of mission plans from the perspective of the implement. Mission plans must be recreated for different machine system configurations even when the operational scope does not change. For example, if the system begins with a mission plan for a leading implement on a skid steer, the mission planning system would need to create an entirely new mission plan for machine system with a trailing implement on a tractor performing the same operation. As such each mission plan is applicable to a limited set of machine systems having the same characteristics, operation controls and physical orientation.

The present disclosure provides an automation system to assign and manage machine system operations through mission plan development designed to improve efficiencies and planning flexibility. Implement-based mission planning allows a mission plan to define implement path plans that are compatible with any implement with similar operational scope. In addition, the mission planning process may build mission plans in a modular process based on selection of modular component selection. This may increase planning system efficiency and reduce overall network storage. In some embodiments, the use of modular plan development using distinct profiles may facilitate simplified mission plans, which may be executed through profile conversions within the onboard electronic control unit.

In some embodiments, the mission plan may provide operational instructions for the implement, which may be executed by a machine system using conversion information to instruct the power unit's operations. This may increase versatility in the mission planning and execution for a project.

The present disclosure provides a system for generating independent profiles for power units and implements. The system also generates connection profiles to facilitate operations when power units and implements are combined into a machine system. The present disclosure creates the ability to increase efficient preparation of mission plans with flexibility to achieve varied operations.

Embodiments of automation planning and operation system may include one or more machine systems. Each machine system may include a power unit and an implement. In some embodiments, the implement is a dependent unit and relies on the power unit to provide motive and operational power. In some embodiments, the implement may include one or more smart implement features, such as communication systems, sensor systems and operation specific controls.

In some embodiments, the power unit may include a communication device configured to transmit machine system information and receive a set of machine system instructions and profile information. Machine system instructions may be a mission plan for execution using the implement. These updates and instructions may be sent through any available communication corresponding to the available communication modules on the power unit.

The power unit may also include a controller to control the operation of the power unit and the attached implement. The controller may be a system with a computer to process and drive control actuators throughout the power unit. In addition, the controller may receive feedback regarding operations through various operational sensors, such as onboard perception systems, proximity sensors, location systems, working load sensors and other sensor systems to collect operational information in real-time. In some embodiments, the implement may include a sensor system to provide further feedback for the controller.

In some embodiments, a power unit may send status updates to a remote system and receive updated machine system instructions from the remote system. The remote system may process and dispatch a mission plan to the power unit, which may include the machine system instructions. In some embodiments, the mission plan may also include applicable implement profile information and connection profile information. In some embodiments, the implement profile information and connection profile information may already be stored onboard the power unit with the power unit profile information. In some embodiments, a temporary operations profile may be generated from and used in place of the power unit profile, implement profile and connection profile.

Some embodiments of the planning and operation system include a remote cloud management system and a control system. The remote cloud management system may receive communications from the machine system(s). In some embodiments, the remote cloud management system may also receive communications from other sources, such as a power unit data source, an implement data source and a project request data source.

In some embodiments, the remote cloud management system includes storage to hold and manage profile information and mission planning rules, limitations and instruction sets. In some embodiments, the cloud management system includes a profile generation system to build profiles for power units, implements and connections between power units and implements.

In some embodiments, the cloud management system facilitates mission planning development. The cloud management system may receive mission plan requests framing a project for a mission plan to accomplish from a control system. The control system may include a dedicated user interface. In some embodiments, a remote user interface accesses the control system via a wireless network connection, such as a mobile phone application.

In some embodiments, framing the project for a mission plan may include identifying account information, a project location or boundaries, available materials, power units and implements, project goals, project constraints and other information. In some embodiments, the control system may be used to define a mission plan using information from the cloud management system, including profile information.

In some embodiments, the remote cloud management system may include an automation system that develops mission plans based on power unit profiles, implement profiles and mission activities.

A BRIEF DESCRIPTION OF THE DRAWINGS

Embodiments will now be described, by way of example only, with references to the accompanying drawings in which.

DETAILED DESCRIPTION

While this invention may be embodied in many different forms, there will herein be described in detail preferred embodiments of the invention with the understanding that the present disclosure is to be considered as an exemplification of the principles of the invention and is not intended to limit the broad aspects of the invention to the embodiments illustrated. It will be understood that the invention may be embodied in other specific forms without departing from the spirit or central characteristics thereof. The present embodiments, therefore, are to be considered in all respects as illustrative and not restrictive, and the invention is not to be limited to the details given herein.

Figure 1:
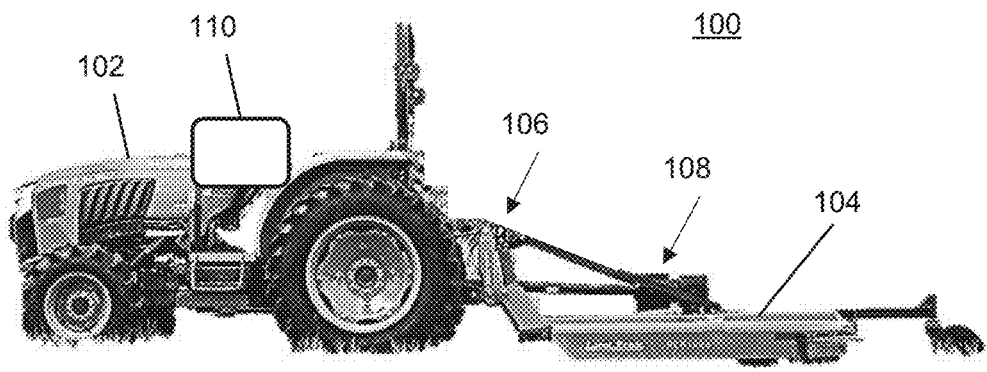
FIG. 1 is an embodiment of a machine system with a trailing implement.
Figure 2:
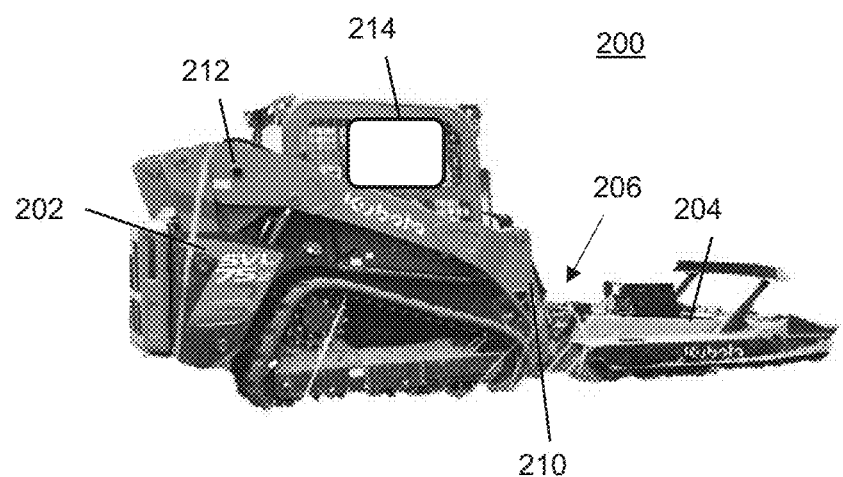
FIG. 2 is an embodiment of a machine system with a leading implement.

FIGS. 1 and 2 show examples of machine systems, which include a power unit and an attached implement. The power unit may be any type of machine that operates to move and provide power to an implement. The power unit may be designed for agricultural, mining, construction, turf and logistics projects, among others. The power unit may include one or more power connections, such as electric connections, hydraulic connections, power take-off connections or others. The implement may be any removably attachable component that provides one or more options for conducting an action. The implement may also be designed for agricultural, mining, construction, turf and logistics projects, among others.

FIG. 1 illustrates shredder system 100 with a tractor 102 operating as the power unit and rotary cutter 104, which is an implement used for shredding. In this system, the implement (rotary cutter 104) trails behind the power unit (tractor 102) during operation.

The rotary cutter 104 connects to the tractor 102 at the implement connection 106. The implement connection 106 may include a physical supporting connection and a power transfer connection. As used herein, a physical supporting connection includes a hitch on the power unit and a hitch frame on the implement. Those skilled in the art will recognize that the hitch and hitch frame refer to any structures for creating physical supporting connections between the power unit and implement. The power transfer connection is used herein to refer to any power supply connection from the power unit to the implement. As used herein, a power transfer connection includes a power output or power drive from the power unit and a corresponding power intake or power drive on the implement.

In this embodiment, the implement connection 106 includes a three-point hitch frame to support the front of the rotary cutter 104. This connection also allows the tractor 102 to raise and lower the rotary cutter 104 for application, height adjustments and travel positions. In addition, the implement connection 106 includes a power take-off connection, which may include a driveline's universal joint that fits over and connects to a power take-off shaft. The second end of the driveline connects to a gearbox 108 on the rotary cutter 104 to convert driveline rotation to blade rotation for the rotary cutter.

In some embodiments, the tractor 102 includes an automation control system, which may include electronic control unit 110, operatively connected to actuators, sensors and other equipment to autonomously operate the machine. The electronic control unit 110 may include a computer system with processors, microcontrollers, memories and other structural components for the management and operation of the autonomous controls. For example, the electronic control unit 110 may drive a machine actuator system with multiple actuators and operational controls to manage the direction and speed of the tractor 102 with steering and speed controls. The machine actuator system may also manage a power output control. In addition, the electronic control unit 110 may manage additional features associated with the implement connection 106 and power transfer, such as raising and lowering the implement connection 106 and controlling the power take-off system. In some embodiments, the control system may be connected to sensor systems associated with the implement connection 106 to determine operational status and needs, such as drag adjustments, speed adjustments or other implement needs.

FIG. 2 illustrates shredder system 200 with a skid steer 202 operating as the power unit and skid cutter 204, which is an implement used for shredding. In this system, the implement (skid cutter 204) is pushed in front of the power unit (skid steer 202) during operation. The skid cutter 204 connects to the skid steer 202 at the implement connection 206. The implement connection 206 may also include a physical supporting connection and a power transfer connection. In this embodiment, the implement connection 206 includes a hitch frame of the skid cutter 204 that corresponds to a hitch plate on the front of the skid steer 202. This connection also allows the skid steer 202 to raise and lower the skid cutter 204 for application, height adjustments and travel positions. In addition, the implement connection 206 includes a hydraulic connection, which allows the skid steer 202's hydraulic system to power the skid cutter 204.

Embodiments of the implement connections 106 and 206 may vary depending on the selection of implement and power unit. In addition, some connection systems may be modified by intermediate components, such as a quick hitch connection or other accessory connection system.

The skid steer 202 includes a lift arm 212 and a hitch control 210. These are both driven by the skid steer 202's hydraulic system to control lifting the implement up and down with the lift arm 212 and rotating the implement with the hitch control 210.

In some embodiments, the skid steer 212 includes an automation control system, which may include electronic control unit 214, operatively connected to actuators, sensors and other equipment to autonomously operate the machine. The electronic control unit 214 may include a computer system with processors, microcontrollers, memories and other structural components for the management and operation of the autonomous controls. As discussed with electronic control unit 110, the skid steer 202's electronic control unity 214 may drive multiple actuators and operational controls to manage operations of the skid steer 202, including driving, hydraulics for the arm controls and skid cutter 204. In some embodiments, the control system may be connected to sensor systems associated with the implement connection 206 to determine operational status and needs.

Figure 3:
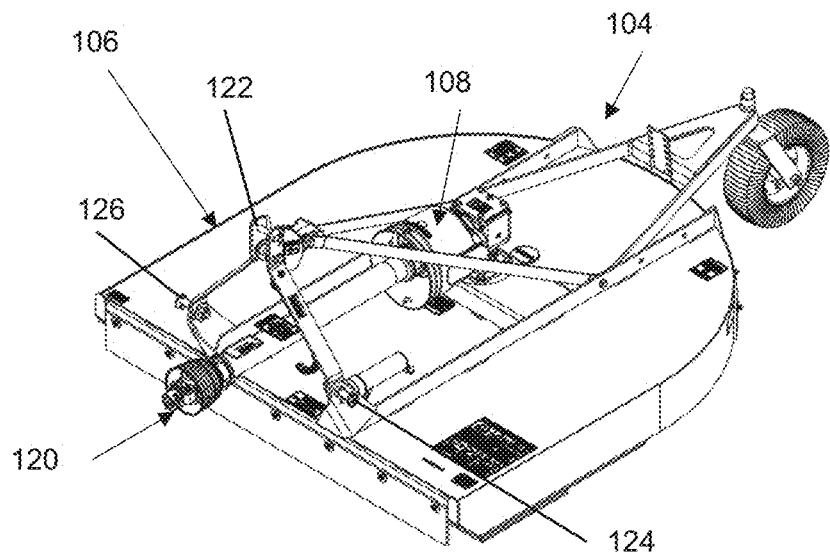
FIG. 3 is an embodiment of an implement.
Figure 4:
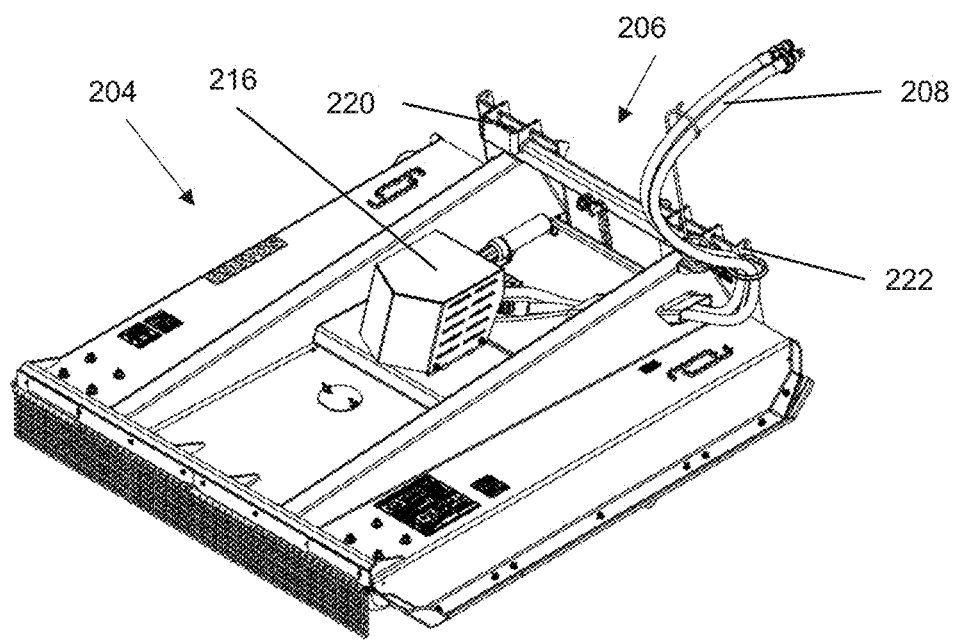
FIG. 4 is another embodiment of an implement.

FIGS. 3 and 4 illustrate prior art versions of the rotary cutter 104 and skid cutter 204. These figures better illustrate the implement's connection components. In FIG. 3, the three-point hitch frame is illustrated with top connection 122 and side pins 124 and 126. A corresponding three-point hitch on a power unit, such as the tractor 102, may attach to each of these points. In addition, the universal joint 120 for the power take-off connection is also illustrated.

Likewise, FIG. 4 illustrates the hitch frame for the skid cutter 204 with first and second top angle bars 220 and 222. The hitch frame will include corresponding slots below the top angle bars 220 and 222, which allow a secure connection to a skid steer 202's hitch and ability to control movement, angle and height of the skid cutter 104. In addition, hydraulic hoses 208 with end couplers are shown to connect the skid cutter 204's control box 216 to the skid steer 202's hydraulic system.

Figure 5:
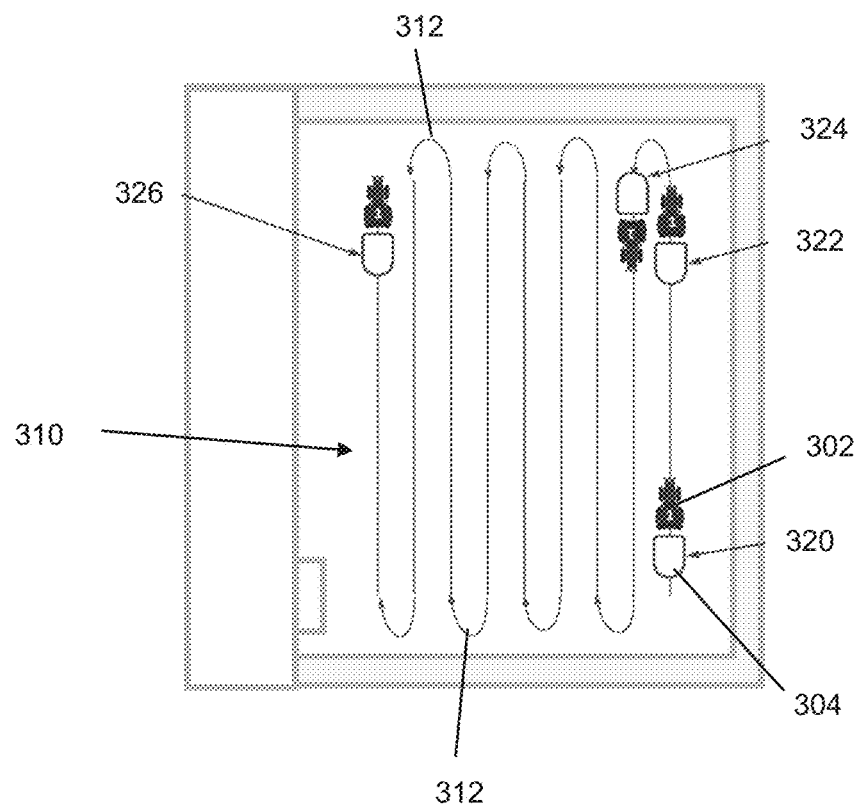
FIG. 5 is a field representation of path plan with transition examples.

FIG. 5 illustrates a field representation of a path plan 310 with transition examples for discussion. In this illustration, power unit 302 is leading an implement 304, and this machine system is shown in different locations along the path plan 310. The different locations with the machine system illustrate transition actions associated with the mission.

The path plan 310 is shown following a serpentine path from the beginning to the end with parallel transversals of the field and headland turns 312 to transition from each leg of the path plan 310. Those skilled in the art will recognize that alternative path plans may be configured.

For discussion, this path plan 310 illustrates a mowing operation in an area of the field covered by the parallel legs of the path plan 310. Accordingly, a mission plan will instruct the machine system to mow over the parallel legs of the path plan 310 and not mow the headland turns 312 in this example. The transition examples begin with operation 320 wherein the power unit 302 lowers the implement 304 to a selected mowing height and provides operational power to the implement 304. As an example, using machine system 100, the electronic control unit 110 on the tractor 102 signals the three-point hitch to lower the rotary cutter 104. The electronic control unit 110 then signals the power take-off to engage at an operational speed for the rotary cutter 104.

The power unit 302 continues along the path plan 310 with the implement 304 engaged to mow. The power unit 302 approaches the end of the first leg of the path plan 310 and reaches the next transition operation 322. At this operation 322, the automation system causes the power unit 304 to raise the implement 304 to prevent cutting during a headland 312 turn. In some embodiments, the automation system may also disengage the power output driving the implement 304.

The power unit 302 proceeds through the headland turn 312. At operation 324, the automation control system causes the power unit 302 to lower the implement 304 to restart the mowing action through another pass. This pattern continues until the power unit 302 reaches the end of the last leg of the path plan 310.

At operation 326, the automation control system causes the power unit 302 to disengage the power provided to the implement 304 to stop the mowing action. In addition, the automation control system causes the power unit 302 to lift the implement 304 to move to the next operation or staging location.

In other embodiments, the implement 304 may be leading the power unit 302. In such embodiments, the timing for the implement 304 to be engaged/disengaged and raised and lowered will remain substantially the same in order to operationally cover the same space. While the operations do not change from the perspective of the implement 304, a power unit 302 that follows the implement 304 will be at a different location on the field when the operations occur than the leading power unit 302 shown in FIG. 5.

Figure 6:
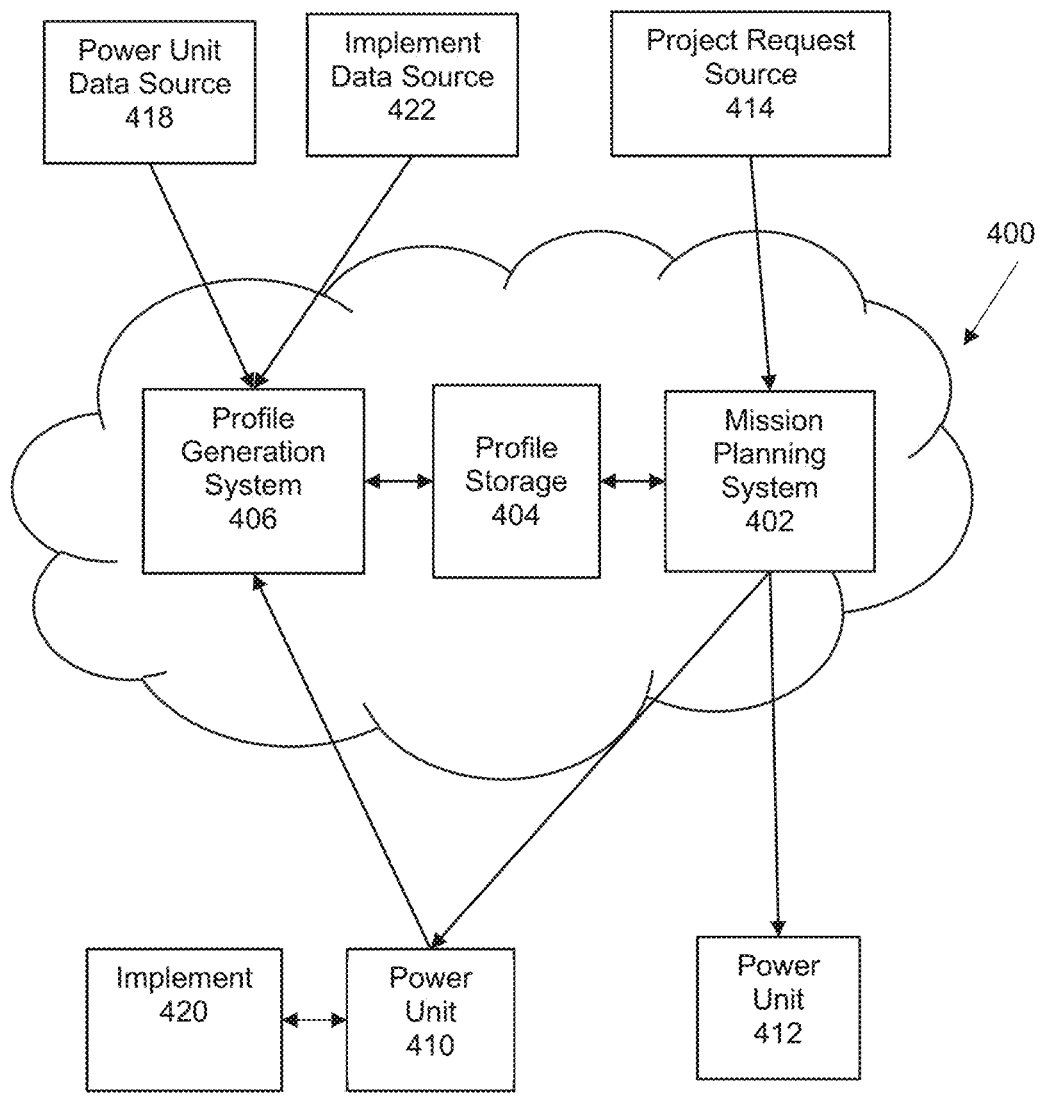
FIG. 6 is an embodiment of a system diagram.

FIG. 6 illustrates an embodiment of a networked ecosystem using a cloud system 400 to manage and develop mission plans and component profiles for an automated system of working machines, including machine systems utilizing power units and implements. In this embodiment, the cloud system 400 includes a mission planning system 402, a profile storage 404 and a profile generation system 406. In some embodiments, the mission planning system 402 may include subsystems to manage development of one or more features of the mission plan. For example, some embodiments, may include machine information analysis systems, profile controls analysis systems, activity program analysis systems, a path planning system or other system components.

In some embodiments, these system components may be discrete components within the cloud system 400 or one or more dedicated servers. In other embodiments, the system components may be integrated. In some embodiments, certain component systems are maintained inside the mission planning system 402, while other system components are operatively connected to provide a service to the mission planning system 402 over a wireless connection, a wired network connection or direct wired connection, such as over a bus interface.

The profile storage 404 may be any type of electronic storage structure or memory device. In addition, the profiles stored in the profile storage 404 may be stored within the memory structure in a variety of formats, such as a database, an indexed file system or other format. In some embodiments, the cloud management system 400 may include additional storage to store additional machine information, mission data, user information, operational assets, instruction scripts, and other information. In some embodiments, the cloud management system 400 may include a script selection database with power unit instructions to integrate into a mission plan and instruct a power unit control system how to operate. These scripts may be modifiable based on profile information.

The mission planning system 402 may access or receive information from the profile storage 404 and other storage sources. In some embodiments, the mission planning system 402 may also send information to the profile storage 404 or other storage options.

In some embodiments, the profile storage 404 maintains profiles for a plurality of components and connections. The profiles may include power unit profiles, implement profiles, connection profiles and other profiles. The component profiles for each power unit, implement or other component may include detailed identification information, operational information and other component-specific characteristics. The identification information may include the component's make and model data, serial number, owner or user information, and/or other identifying information.

The power unit profiles may also operate as a configuration or information file for the power unit or mission planning system 402 to use. In some embodiments, the power unit profile may include mission plan conversion control instructions, which may be used by a power unit in conjunction with the mission plan to execute a mission plan instruction. For example, the power unit profile may include control instructions for identifying and controlling specific components, such as a front hitch or a back hitch.

The implement profiles may also operate as a configuration or information file for the power unit or mission planning system 402 to use. In some embodiments, the implement profile may include mission plan conversion control instructions, which may be used by a power unit in conjunction with the mission plan to execute a mission plan instruction. For example, an implement profile for a smart implement may include control instructions for a power unit to communicate with the implement. In addition, the implement profile may include operational information for smart features including version information, which may affect the capabilities of the feature. For example, the implement profile may identify the implement includes a version one sensor array. The mission planning system 402 may determine the capabilities that the version one sensor array provides for the implement.

The connection profiles may also operate as a configuration or information file for the power unit or mission planning system 402 to use. In some embodiments, the connection profile may include mission plan conversion control instructions, which may be used by a power unit in conjunction with the mission plan to execute a mission plan instruction. For example, the connection profile may identify modifications for power unit operations to account for the connected implement. As another example, the connection profiles may correlate power unit controls to implement operations.

In some embodiments, the connection profiles may further provide compatibility limitations or capabilities based on smart features available on the implement, such as precision controls, sensor systems or other features. For example, the connection profile may limit capabilities for using an implement sensor system based on the sensor system version and feedback potential. As another example, the connection profile may facilitate high precision operations based on advanced systems available on the implement.

The cloud management system 400 also includes a profile generation system 406, which may create new profiles and update existing profiles. The profile generation system 406 may generate a power unit profile from information about the power unit characteristics, capabilities and automation control system. Similarly, the profile generation system 406 may create an implement profile from information about the implement characteristics, capabilities and control system. The profile generation system 406 may also generate connection profiles based on implement profile information and power unit profile information. An example process for generating a connection profile is provided in FIG. 7.

The profile generation system 406 may access or receive information from the profile storage 404 and other storage sources. In some embodiments, the profile generation system 406 may also send information to the profile storage 404 or other storage options.

In some embodiments, the mission planning system 402 operates on the same structure, such as a server, with the profile storage 404 and other storage. In some embodiments, the profile generation system 406 also operates on the same structure with the mission planning system 402. Within cloud structure 400, the mission planning system 402 may be connected to the profile storage 404 over one or more communication systems depending on the underlying server array structure. For example, the mission planning system 402 may be implemented on a first server, using a processor and program memory connected via a wired bus. When evaluating profiles, the mission planning system 402 may use a first server communication card to access the Internet or other network in connection with the profile storage 404. Similar communication options may be implemented to connect the profile generation system 406 with the profile storage 404.

In some embodiments, the processing operations may also be shared among multiple processors or separate computers to speed the evaluation through parallel processing operations. For example, when identifying applicable profiles, the mission planning system 404 may implement parallel processing of apportioned sections of the profile storage 404 to identify applicable power unit profiles, implement profiles and connection profiles. As another example, the mission planning system 402 may assign separate computers to parallel process two distinct project requests.

In this embodiment, the profile generation system may receive data from a power unit data source 418 and an implement data source 422. Embodiments of the system may include any number of power unit data sources 418 and an implement data sources 422. The data sources 418 and 422 may include external user interfaces, such as phones, computers, server systems, tablets and other devices, used by manufacturers, mechanics, machine users, aftermarket suppliers and other sources. In addition, the profile generation system 406 may receive information from power units 410 or 412 directly. In some embodiments, a smart implement may include a communication feature to allow an implement 420 to send implement information directly to the profile generation system. In other embodiments, the power unit 410 may receive information from a communication with implement 420 or from machine readable data on the implement 420. The power unit 410 may then transfer information about the implement 420 to the profile generation system 406.

In some embodiments, the power unit data source 418 and implement data source 422 provide information to the cloud management system 400 through an information collection storage, which is accessible to the profile generation system 406. In some embodiments, the mission planning system 402 may provide feedback or other information regarding the power units or implements to the profile generation system 406.

In this embodiment, a single project request source 414 is identified. In other embodiments, a system may have multiple project request sources. The project request source 414 may be external user interfaces, such as phones, computers, server systems, tablets and other devices, used by any machine user or entity. In some embodiments the project request source 414 may be the operator of the cloud management system 400.

The mission planning system 402 may receive requests from the project request source 414. In some embodiments the mission planning system 402 may translate a project request into a standard format to parse and analyze. For example, the project request received from the project request source 414 may be a natural language request from the project manager, such as a request received in an audio format. The mission planning system 402 may convert the audio to text and identify the project definitions.

The mission planning system 402 may create necessary scripting to achieve the project based on the project request analysis, profile information and instructional scripting. In some embodiments, the mission planning system 402 may create a mission plan that provides instructions directed to implement actions and path planning. The power unit may convert the implement actions and transition timing to executable instructions based on the power unit profile and connection profile modifications.

The mission planning system 402 may then issue the mission plan to each power unit 410 and 412. The mission plan communication may be sent using a communication system network card over one or more communication channels to the communication modules and electronic control units on each power unit 410 and 412.

Power units 410 and 412 may be any number of power units. In some embodiments, the power units may communicate with a smart implement, such as illustrated with power unit 410 and implement 420. In other embodiments, all communication is limited to the power unit, such as power unit 412 without a communicating implement. Notable, power unit 412 may be connected to an implement that does not communicate, such as the prior art cutters shown in FIGS. 3 and 4.

In some embodiments, the power units 410 and 412 may be the same type of machine. For example, power units 410 and 412 may both be tractors. In other embodiments, power unit 412 may be a distinct type of machine from power unit 412. For example, power unit 410 may be a tractor designed to pull a shredder and power unit 412 may be a skid steer designed to push a shredder.

Figure 7:
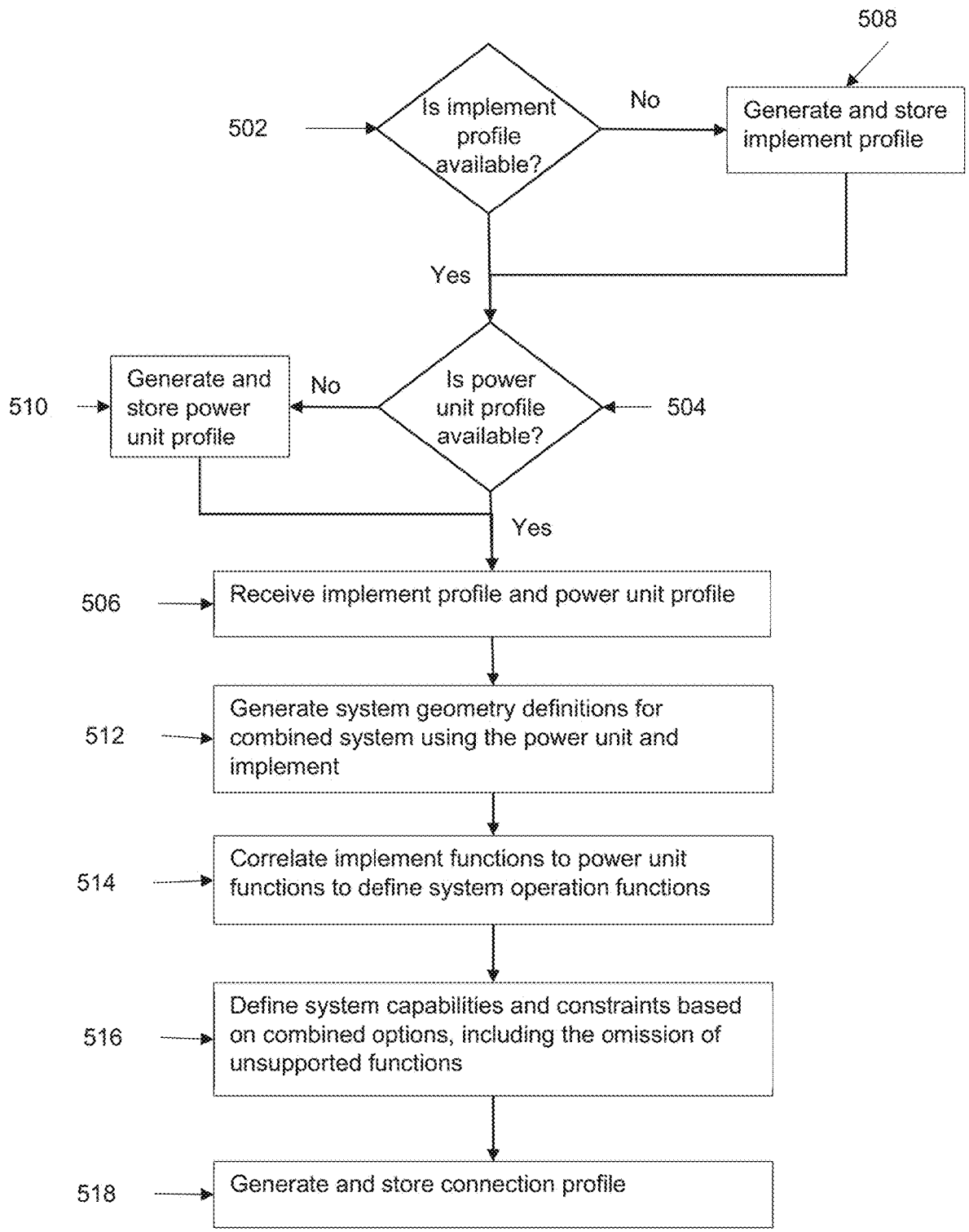
FIG. 7 is an embodiment of an operation flowchart for generating a connection profile.

FIG. 7 illustrates an embodiment of a flow chart for creating a connection profile. The connection profile provides a conversion framework for accounting for specific implement and power unit configurations.

In decision box 502, the system determines if an implement profile is available. For example, the profile generation system 406 may access the profile storage 404 to determine if the implement profile for an identified implement is stored in the profile storage 404. Alternatively, the profile generation system 406 may send an inquiry to the profile storage 404 to determine if the applicable implement profile is available. In some embodiments, implement profiles may be stored in a third-party storage that the system may also access to obtain an implement profile.

If an implement profile is available, the system continues to decision box 504 to determine if a power unit profile is available. Like the determination for implement profile availability, the system may access a storage or submit an inquiry to obtain availability information. While the illustration orders decision boxes 502 and 504, they may proceed in either order or in parallel in other embodiments.

If the power unit profile is available, the system moves to box 506 and receives the implement profile and power unit profile in this embodiment. The step of receiving the implement profile and power unit profile may be integrated into the decision steps in some embodiments. For example, when the profile generation system 406 accesses the profile storage 404 to determine availability of an implement profile or power unit profile, the profile generation system 406 may also download a copy of the profiles when they are identified. Similarly, an inquiry for profile availability may include a request for the profiles that are identified as available.

In this example, the implement profile and power unit profile are received in the process. Those skilled in the art will recognize that embodiments may rely on access to information in the stored profile instead of receiving a copy of the profile. The management of the receipt versus access may depend on the structural setup of the cloud management system 400 relating to storage options, processing capabilities, and communication speeds and bandwidths. In some embodiments, the cloud management system 400 may be flexibly designed to facilitate different options based on current conditions.

If the implement profile is not available in decision box 502, the system may proceed to box 508, wherein the system will generate and store a new implement profile. The system may retrieve information regarding implement features, specifications, action options, capabilities, constraints, connection formats and other information. This information may be from an implement data source 422, such as an implement manufacturer system.

Using the information, the system may build the implement profile with necessary information for the operation, including sizes, steering and propulsion effects, activity definitions, implement function definitions, implement capabilities and constraints, and other information that may impact a machine system operation with a power unit. The system may then store the implement profile.

Likewise, if a power unit profile is not available, the system will proceed to box 510 to generate and store a power unit profile. The system will follow a similar pattern to the development of the implement profile. Specifically, the system will gather power unit information, including information regarding the power unit operations, features, controls, constraints, connections, the automation system and instructions, and other information. This information is used to build a power unit profile, which may be stored.

Once the implement profile and the power unit profile are generated and available, the new implement profile and power unit profile are received in box 506. Those skilled in the art will recognize that in some embodiments a newly generated profile may already be within the profile generation system and the receiving step may be skipped. In other embodiments, different profile generation systems may be used for different types of profiles. For example, a system may include an implement profile generation system, a power unit profile generation system and a connection profile generation system. In such cases, the profiles may need to be received by the connection profile generation system regardless of the source of generation or storage.

Once the system has received the implement profile and power unit profile, the system proceeds to box 512, wherein the system generates the geometry definitions for the combined machine system using the selected power unit and implement. The system evaluates the power unit profile and implement profile to determine applicable connection systems and geometry effects when the implement is attached to the power unit. For example, the system may determine that the machine system length from the implement length and the power unit length minus any overlap created by the connection. As another example, the system may determine a driving width based on the wider of the implement and the power unit and an operation width based on the scope of operation for the implement.

Those skilled in the art will recognize that the geometry information is necessary to manage the operation of the combined machine system. The geometry may be used in determining turning options and constraints, field coverage during operations, path options and constraints and other information.

In some embodiments, the power unit profile, the implement profile and geometry information may be used to generate integrated telematics data for a combined unit. The integrated telematics data may be selected or converted from a collection of power unit telematics data and implement telematics data. In some embodiments, integrated telematics data may be based on a conversion to power unit telematics data when an implement does not include separate telematics data. The conversion or a selection process to obtain integrated telematics data may be defined in the connection profile.

In box 514, the system correlates implement functions to power unit functions to define system operation functions. The system may analyze the implement profile and power unit profile to determine which implement functions are compatible with the power unit. The compatible functions may be correlated with the power unit operations to run the implement. For example, a fertilizer implement that runs from a power take-off (PTO) may offer different application scope options based on the PTO's rotations per minute (RPM). The power unit's automation controls may be correlated to the PTO requirements for each function option. With the correlation, the power unit will know which PTO RPM to apply for a giving implement function option. The system will correlate the implement options to the selected power unit output control.

In addition, the implement may offer a variety of functions tied to different power unit systems. For example, an implement may have a function that operates from a power unit hydraulic system and a second function tied to an electrical connection. The power unit's automation controls for these implement functions may be tied to the automation controls for the hydraulic system and electrical system outputs.

Similarly, connection controls may be correlated for effect on the implement. For example, an implement height requirement may be correlated to the hitch controls of the power unit.

In box 516, the system defines capabilities and constraints based on the combined options, including the omission of unsupported functions. The defined capabilities and constraints may include definitions relating to steering and propulsion as well as operational controls. For example, the system may define turning radius limitations, speed limitations (minimum and maximum), implement operation scope and other information. In some embodiments, the system will define capabilities and constraints for non-operational movement and operational movement. For example, during operation, the power unit may be limited to a certain travel speed while also requiring a set PTO output.

As an example of defining capabilities and constraints, a PTO-driven fertilizer implement may offer different application scope options based on the PTO RPMs. If the power unit provides a PTO with a limited RPM range, the power unit may only be capable of running a subset of the implement's application scope options. The system will correlate the options that the selected power unit will support as capabilities and unsupported ranges as unsupported functions.

In some embodiments, the unsupported functions are simply omitted from the capability options that the system may select. In other embodiments, the unsupported functions may be in the connection profile as disabled options. In defining capabilities and constraints, the system may identify operations that are provided by the implement with the correlated control operations required from the power unit.

In box 518, the system will generate and store a connection profile based on the combined definitions and correlations. The connection profile may include modifications for a power unit profile, replacement information for a power unit profile or additional information for the power unit profile. In this embodiment, the connection profile converts implement information for use by the power unit based on the power unit's profile because the automation controls are part of the power unit. In some embodiments, the connection profile may be designed as an operation profile to use in place of a power unit profile, when the combined machine system is used. The connection profile may be stored in a profile storage for use by a mission planning system or updated by a profile generation system.

Figure 8:
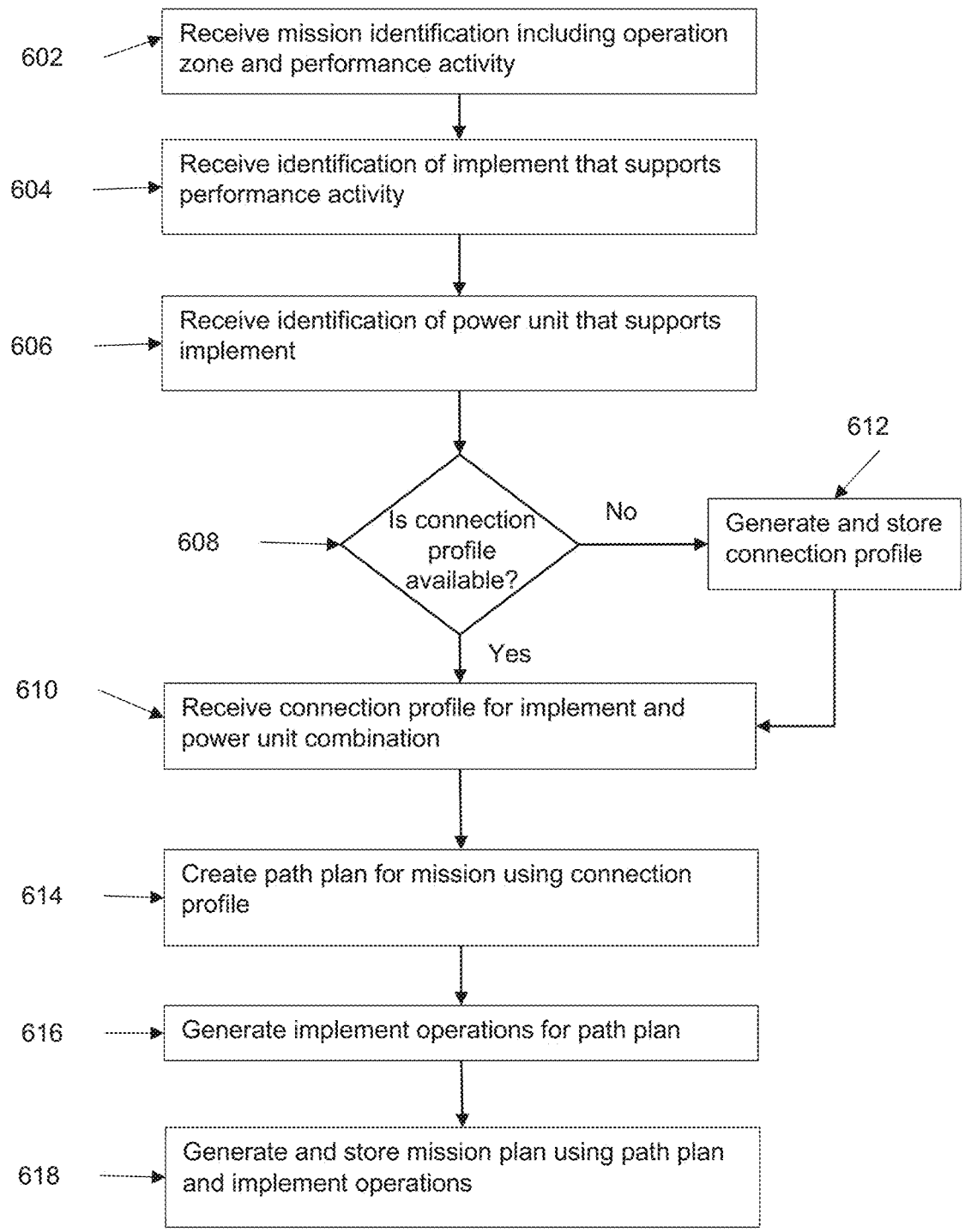
FIG. 8 is an embodiment of an operation flowchart for generating a mission plan.

FIG. 8 illustrates an embodiment of a process to develop a mission plan. The process begins with the system receiving mission identification including operation zone and performance activity in box 602. In some embodiments, the request for a mission may be received through a remote user-interface on a computer, smartphone, tablet or other device. A user may select an operation zone and a performance activity through a user interface. For example, the user may select a field and identify shredding as an activity. These may be provided in a user interface as selectable options in some embodiments. In some systems, the user may be able to provide the information through a form or other intake option. The user input is received and parsed into project information for the mission including the location of the operation zone and activity definition than corresponds to an available operation in the system.

In box 604, the system receives an identification of an implement that supports the identified performance activity. In some embodiments, the user may select an implement from the system that may conduct the operation. The system may already have an inventory of implements available to the user for selection. In some embodiments, the system may filter an available set of implements down to those implements that have a function that corresponds to the selected performance activity. The user may then select an implement from the reduced list.

In box 606, the system receives a selection of a power unit that supports the implement. Like the implement selection, this may be a user selection from a broad list or a filtered list. For example, after an implement is selected, the power unit options available for selection may be reduced to those that support the physical and power connection type required by the implement.

In some embodiments, the system may automatically identify an implement and power unit for a selected mission. The system may evaluate capabilities, status and other information to select a preferred implement and power unit for the mission. Once selected, the system may send the selected implement and power unit identification to the user. The user may then approve or modify the system's selection.

Once the mission, power unit and implement information are selected, the system determines whether a connection profile for the selected power unit and implement combination is available in decision box 608. For example, the mission planning system 402 may access or send an inquiry to the profile storage 404 to determine if an applicable connection profile is available. If the connection profile is available, the system receives the connection profile for the implement and power unit combination in box 610. As with other receiving steps, other embodiments may use the connection profile without receiving a copy. For example, the mission planning system may access and retrieve only the information needed from the connection profile stored in the profile storage 404.

If the connection profile is not available, the process proceeds to box 612, wherein the system generates and stores a connection profile. As an example, the connection profile may be generated as described in FIG. 7. Once generated, the process returns to receiving the connection profile in box 610.

In another embodiment, the mission planning system 402 may determine that a connection profile does not exist in the profile storage 404 for the selected power unit and implement. The mission planning system 602 may send a request to the profile generation system 406 to create a connection profile. The profile generation system 406 may generate a new connection profile and send the connection profile to the mission planning system 602 to continue the process.

In box 614, the system creates a path plan for the mission using connection profile. The system may determine the operational path needed to move and operate the implement to achieve the performance activity in the operational zone selected. The path plan may provide a preliminary travel plan for the power unit to move the implement as needed for the project. The system may analyze the connection profile to identify operational geometry for the implement and movement requirements for the combined machine system. These requirements and limitations allow the system to define a path plan for this combination.

In box 616, the system generates implement operations for the path plan. As an initial part of this step, the mission planning system 602 defines operations for the implement along the path plan. For example, the implement is supposed to mow along active sections of the path plan and turn without mowing in certain headlands of the field. The mission planning system 602 may identify the active areas as engaged operations and inactive areas as disengaged. Those skilled in the art will recognize that the operations may be more complex through the engaged sections. Some implement operations may require more detailed instructions for operation, such as a hay bailer which requires process changes between the collection of hay and release of hay bales.

In some embodiments, the mission planning system 602 may further define operational controls for the power unit to drive the identified implement operations. For example, when the mission plan identifies the implement operation is active on a path plan, the mission plan instructions may use the connection profile information to instruct certain PTO RPMs to drive the implement rotary cutters at the appropriate rate. For other machine systems, the mission plan instructions may define a hydraulic flow rate for a hydraulicly driven rotary cutter.

Those skilled in the art will recognize that the same implement operations and path may be converted to different machine system path plans and operational control instructions for a power unit. This allows variability that may be achieved through modification information built into a connection profile. This also allows project selection by a user to correspond to implement operation definitions that are convertible by the system to automation control instructions.

In box 618, the system generates and stores the mission plan using the path plan and implement operations. The generated mission plan may account for a specific machine system compiled from an individual power unit and implement. The generated mission plan may be flexible for implementation to another system based on implement operations, which may be structured for a connection profile to convert general operations into the automated instructions for the actual machine system.

The system may store the mission plan for later use or send the mission plan to a power unit for an upcoming execution of the plan. In some embodiments, the mission plan is sent to the user for uploading into the power unit. The implement may be attached or will be attached prior to execution of the mission plan from a set staging area. In some embodiments, the mission plan may include a pre-staging instruction set. The pre-staging instructions may include automated implement connection in some embodiments.

Figure 9:
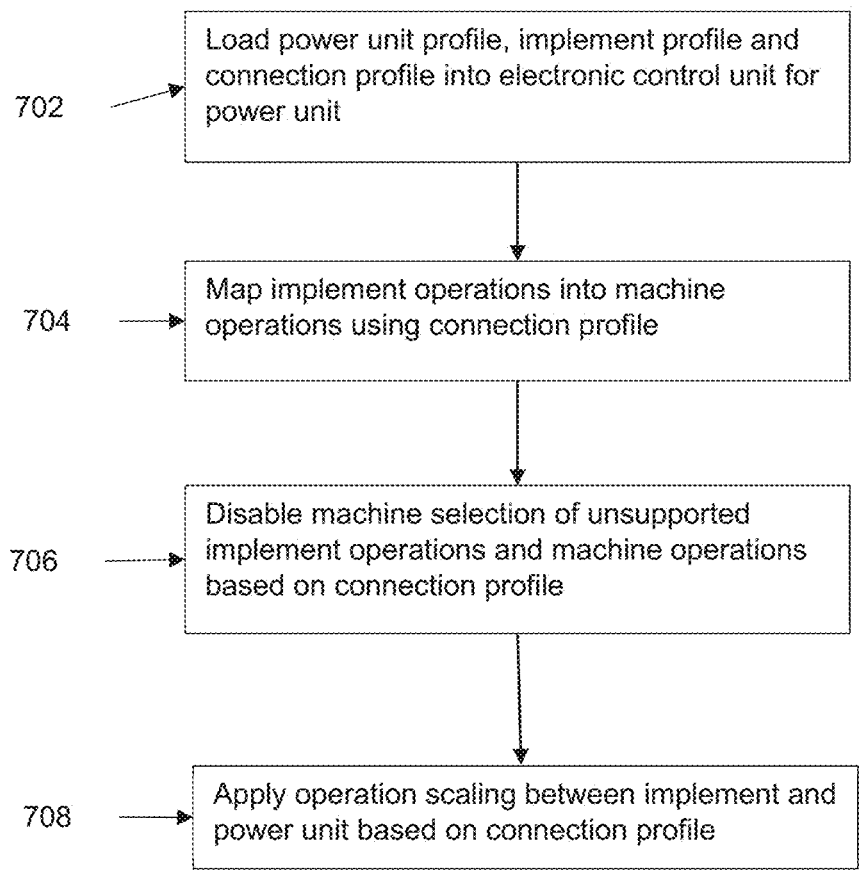
FIG. 9 is an embodiment of a system flowchart for power unit mission loading.

FIG. 9 illustrates a loading process for the power unit's electronic control unit to account for an attached implement. The loading process and operations again use a connection profile to guide the modifications and accessory capabilities through the combined power unit and implement.

In box 702, the process begins with loading the power unit profile, implement profile and connection profile into the electronic control unit for the power unit. In some embodiments, loading the profiles may occur from a local connection, such as a wired system, a portable memory device or short-range communication, such as a Bluetooth communication, Wi-Fi communication or other communication standard. In some embodiments, the loading process may be conducted remotely through a remote communication system directly. For example, a power unit with a long-range communication capability, such as a cellular communication link, may receive a direct download from the cloud management system to the power unit over the cellular network. In some embodiments, the loading process may occur through a remote communication system and a local communication hub. For example, a garage for storing power units may include a wired Internet communication system that transmits information to a local Wi-Fi hub in the garage. The download may be received at the hub from the Internet communication system and processed through to the power unit over a Wi-Fi communication signal.

The loading process may be dependent on the power unit's available connections and communication systems, as well as availability for communication in the location of the power unit. For example, even if a power unit has a cellular communication option, a portable memory may be necessary in remote locations without cellular connectivity.

In box 704, the electronic control unit in the power unit maps implement operations into the corresponding machine operations using the connection profile. For example, the connection profile may provide that the shredding implement operation corresponds to the machine operation for engaging specific lines of the hydraulic system at a specified flow rate. Similarly, the implement operation may have a prerequisite height setting that must be converted through the connection profile to a hitch control instruction to raise or lower the hitch and adjust to level if needed. These controls and adjustments may be mapped into the electronic control unit for operation of the machine system with the implement.

In box 706, the electronic control unit disables machine selection of unsupported implement operations and machine operations based on the connection profile. Some machine system combinations will not support all of the implement features or will preclude certain power unit features. As an example, an implement with multiple operation settings requiring different power outputs may include one or more outputs that the power unit cannot support. In such a machine system, the electronic control unit would indicate that the unsupported settings are disabled.

In this step, the electronic control unit disables the option to select such features during operation. The option may be disabled by removal from the electronic control unit options. In other embodiments, the electronic control unit may generate a flag to indicate that a feature is unavailable. Those skilled in the art will recognize that this process of disabling such features may vary by system.

In box 708, the electronic control unit applies operation scaling between the implement and power unit based on connection profile. In this step the electronic control unit implements any scaling needed between the power unit and the implement to ensure that power unit operations correlate to the implement needs for operation output. For example, if the rotary cutters require a certain speed in order to mow a standard field at a given speed, the electronic control unit scales the power unit travel speed to the necessary PTO RPMs to drive the rotary cutter appropriately. As another example, the electronic control unit may alter the control output for raising and lowering an implement to a set height. In the connection profile, the scaling may correlate a hitch height to the corresponding implement height. This scaling may also include adjustments to the power unit turning radius, operational patterns and other features.

Figure 10:
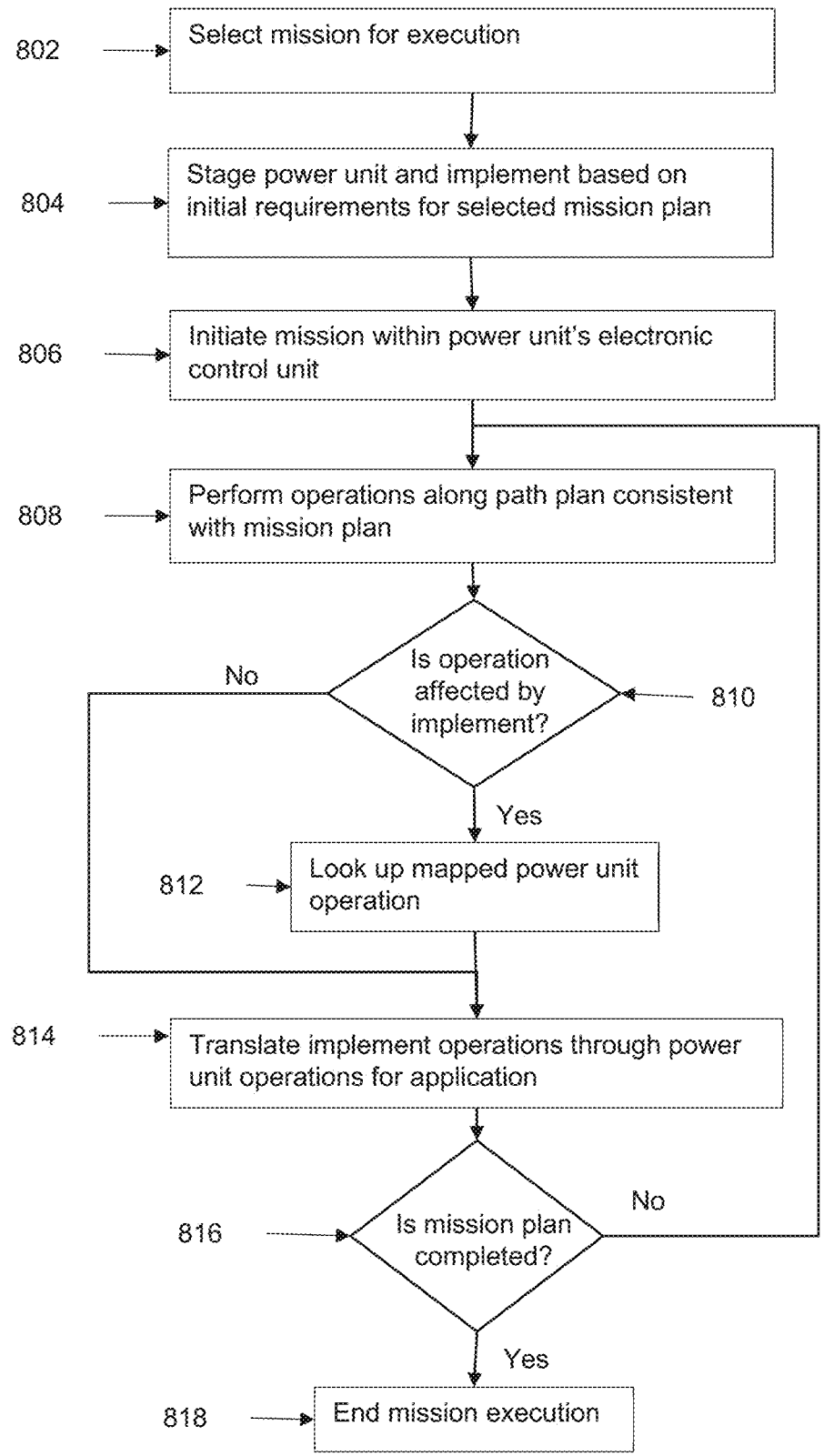
FIG. 10 is an embodiment of a system flowchart for executing a mission plan.

FIG. 10 illustrates an embodiment of a mission execution process. The process begins with selection of a mission for execution in box 802. In some embodiments, a user may select the mission for execution through an onboard or remote user interface. In some embodiments, the selection may be automated through the system based on prior scheduling or system evaluation. Remote selection may be available for any power unit that is available through one or more communication configurations, such as the direct and indirect remote communication options.

In some embodiments, a user's selection of a mission will result in the mission being placed in a queue for execution. The system may send prerequisite staging, configuration or other information to the user to confirm pre-execution requirements. For example, the system may send a staging location to the user and confirmation questions to ensure that a fertilizer mix is loaded for a fertilizer project. In some embodiments, the system may further provide fuel expectations to avoid refueling or request a refueling machine to be available based on the project scope.

In box 804, the power unit and implement are staged based on the initial requirements for the selected mission plan. Some embodiments may require the machine system to be in a staging area and attached for operation. In other embodiments, the mission plan may be configured to connect the power unit to the selected implement through automated controls, as long as the implement location and power unit are at known locations and properly pre-configured. In some embodiments, the system will receive a signal to confirm when the machine system is staged and prepared to begin execution.

In box 806, the system initiates the mission within the power unit's electronic control unit. In some embodiments, the system initiates the mission in response to a user initiation signal. In other embodiments, the system may automatically initiate the mission based on one or more initiation triggers occurring. For example, once the system confirms that the power unit is connected to the implement and located in the staging area, the system will initiate the mission within the electronic control unit. In some embodiments, the system may also wait for a scheduled operation window or other ancillary triggers. These triggers or prerequisites may be selected by a user when setting up a mission or determined by the system. For example, the system may automatically confirm weather reports for appropriate weather conditions preceding a hay baling mission.

In box 808, the power unit proceeds with performance of operations along a path plan consistent with the mission plan. The power unit proceeds based on automated control systems in response to the electronic control unit executing the mission plan.

When performing the operations from the mission plan, the electronic control unit determines whether the mission plan operation is affected by the implement in decision box 810. The electronic control unit may confirm if the operation source is from the power unit profile or the connection profile to determine whether the implement affected the power unit's standard operation. In some embodiments, the electronic control unit's storage in which the profiles have been loaded may include an index indicating available operations and the operation sources to allow efficient determination.

In some embodiments, the electronic control unit may use an operation profile, which compiles the power unit profile with the connection profile. In such embodiments, the operation profile may provide all operation instructions applicable to the machine system as assembled and connected.

If the operation is affected by the implement, the electronic control unit looks up mapped power unit operation in box 812. For example, if the implement requires a higher throttle for the selected speed than the power unit by itself, the mapped power unit operation will include the throttle adjustment for achieving a selected speed withing the mission plan. Those skilled in the art will recognize that the throttle system is an example of a propulsion system, and that alternative propulsion systems may be used in some embodiments.

Once power unit operations have been determined through the mapping, the electronic control unit proceeds to box 814. Similarly, if the power unit operation is unaffected by the implement, the electronic control unit proceeds to box 814. In box 814, the electronic control unit translates any implement operations through the power unit operations for application. For example, the electronic control unit may execute a mission plan calling for mowing at a specific location by engaging a PTO at a set RPM to run a rotary cutter implement. The electronic control unit translates the mow operation into the power unit's PTO drive requirements for the attached implement. This translation may be provided by the connection profile loaded into the electronic control unit as an implement operation conversion for the specific power unit.

In some embodiments, certain terminology for the implement may be translated to corresponding terminology for the power unit. For example, the implement profile may identify a PowerControl for implement operation identification while a power unit profile may refer to this control as a PTOControl. The connection profile will correlate the terminology and modifications for power unit operation to correspond with implement operation instructions.

For another example, a different implement connected to a hydraulic drive system will require the electronic control unit to provide power through the appropriate lines of the power unit's hydraulic system to drive the implement. In this example, the mission plan may likewise define the operation as mowing and the electronic control unit will translate this implement operation to the power unit's applicable control system. For example, if the implement profile identifies PowerControl for implement operation and a power unit profile uses Aux1Control, the connection profile will correlate the terminology and controls for power unit operation to correspond with implement operation instructions.

In box 816, the electronic control unit determines if the mission plan has been completed. In some embodiments, the electronic control unit evaluates completion based on the existence or lack of further operational instructions. In such cases, the mission plan may include an ongoing operation to confirm position along a path plan up until the end is reached. In some embodiments, the electronic control unit's determination evaluates placement on the path plan, additional operations listed, emergency instructions and other information that may determine whether the mission plan is complete or has been stopped.

If the mission plan is not completed, the power unit will continue to process operations for the power unit and implement based on the loaded profiles, which provide any necessary modifications or translations. The electronic control unit will return to box 808 to perform further operations consistent with the mission plan.

If the mission plan is completed, the electronic control unit will end mission execution in box 818. In some embodiments, ending the mission execution may include automated post-mission actions. For example, if the mission plan is completed outside a staging area or other designated location, the electronic control unit may execute control instructions for moving the machine system to the designated location. In some embodiments, the post-mission actions may also require applying modifications to operations through the connection profile.

In some embodiments, the power unit and/or the implement may collect telematics data during operation. The collection may occur throughout an operation, at periodic times or when certain actions occur triggering data collection. In some embodiments, the telematics data from the power unit and the implement will be compiled in a power unit's electronic control unit prior to transmission to the cloud management system. The separate telematics data may be transmitted for each of the power unit and implement.

In some embodiments, the electronic control unit may transmit a set of integrated telematics for the combined unit based on telematics data collection management information in the connection profile. For example, if the connection profile defines the power unit telematics data as the relevant data, the integrated telematics transmitted to the server may match the power unit telematics data. As another example, the connection profile may identify certain telematics data as power unit data and other telematics data as implement data, wherein the integrated telematics data is a selected combination of telematics data from the power unit and the implement. As yet another example, the connection profile may include a conversion analysis based on one or both sets of telematics data in order to generate integrated telematics data for the combined unit.

As an overall example, a user may remotely sign into an account in the cloud management system 400 through the user's smartphone, which is running an application for mission planning and selection. When the user signs into the account, the cloud management system 400 may guide the mission request process based on the information on operation locations, power units and implements already loaded in the account. For example, the application may begin with a location selection option, which provides addresses, images, names or other information to identify the available locations. For example, the user may select the field shown in FIG. 5.

Once the user selects the location, the system may present performance activity options for the location, such as mowing, fertilizing, terraforming, seeding, etc. For example, the user may select mowing.

Once the location and activity are selected, the application may provide implement options that support the activity selected. For example, the application may show a series of mowers and shredders including the rotary cutter 104 shown in FIG. 3 and skid cutter 204 shown in FIG. 4. For illustration, the user may select the rotary cutter 104.

With the implement selected, the application will provide power unit options that support the implement. For this example, a series of power units with rear hitches and PTO drives may be presented with the user selecting tractor 102.

At one or more stages in the selection process, the user may have options for entering new locations or components if the desired location or components are not already loaded. In such situations, the user may need to provide a corresponding profile or additional information for the system to generate a profile or field definition.

In some embodiments, the application may provide options for additional limitations or information to be selected or provided by the user, such as scheduling information, staging contacts, designated staging or completion locations, weather requirements or other information.

Once the user completes the request, the mission planning system 402 creates a mission plan based on a connection profile for the selected power unit and implement. As discussed, the mission planning system 402 may determine that a connection profile is needed if one is not already available in the profile storage 404 for the selected power unit and implement. The mission plan may include a path plan, such as path plan 310, for the selected power unit and implement. The path plan may provide operational zones, wherein the mowing is intended to occur, and nonoperational areas, which may be used for headland turning. The mission plan may further include implement operations to occur within the operational zone. For example, the mission plan may provide a start mowing instruction at the beginning of each leg of the path plan within the operational zone. The mission plan may further provide a stop mowing instruction at the end of each leg within the operational zone. The mission plan may direct the operational instructions to the location and actions of the implement along the path plan instead of the power unit's location and actions.

After the mission plan is completed, the cloud management system 400 may send the mission plan, power unit profile, implement profile and connection profile to the local user, who may be different than the planning user, at the field to load in the tractor 102's electronic control unit 110. In some embodiments, the power unit may have already been preloaded with one or more of the power unit profile, implement profile and connection profile. This may be likely if the same machine system has been used previously and does not need to be updated. In such circumstances, the mission plan may be all that is necessary for loading in the power unit. In some embodiments, the planning user or the local user may be able to select what file needs to be loaded to reduce unnecessary transfers.

In this example, the local user may connect the rotary cutter 104 to the tractor 102, if needed, and move the machine system 100 to a staging area. The mission may then be executed following the path plan provided. When executing the mission, the electronic control unit 110 will modify the tractor 102's operations, such as steering and propulsion controls, as directed through the connection profile. The electronic control unit 110 will also translate implement operations from the mission plan, such as setting implement height and mowing, into the tractor 102's corresponding actions, such as adjusting three-point hitch height and engaging the PTO drive. When following the path plan 310, the tractor 102 will enter the operational zone before the trailing rotary cutter 104 is engaged and leave the operational zone before the rotary cutter 104 is disengaged in order to cover the operational zone.

In an alternative to the execution process, the local user may determine that the tractor 102 is unavailable and select to use the machine system 200 instead because the skid cutter 204 is the same width as the rotary cutter 104. In order to switch to the machine system 200, the local user may submit an updated request for a connection profile for the machine system 200 and mission plan check to confirm that the same mission plan may be used for the machine system 200. The path plan from the mission plan may be applicable to the machine system 200 based on the similar operation and geometry of the two implements. For this replacement, the system may confirm that nonoperational space allows for a leading implement and power unit to setup at the beginning and turn in the headland spaces to use the same path plan.

From the operational perspective, the connection profile for machine system 200 will facilitate modifications to the skid steer 202's operations and translating the skid cutter 204's operations to the skid steer 202. This is possible based on the mission planning from the perspective of the implement. The mission plan that provides for a start mowing instruction at an implement's given location may be achieved by the alternate machine system 200. The electronic control unit 214 controls the skid steer 202 to set the skid cutter 204 to a height setting by adjusting the arm 212's height and leveling with hitch controls 210. The electronic control then engages the skid cutter 204 through the skid steer 202's hydraulic system controls. The skid steer 202 disengages the skid cutter 204 mowing operation or raises the skid cutter 204 to prevent cutting when the skid cutter 204 reaches the end of the operational zone.

Some embodiments of the power units will include onboard obstacle avoidance systems that will modify power unit operations based on obstacles. Obstacles may be detected by a power unit's sensor system or a sensor array on an attached implement in some embodiments. Once the obstacle is bypassed or accounted for by the obstacle avoidance system, the electronic control unit will return to processing the mission plan. During operation, an obstacle avoidance system within the machine system may identify an obstacle based on one or more signals from a sensor or sensor array. The obstacle avoidance system may then determine an avoidance operation for the machine system in order to avoid the obstacle and return to the mission plan. The control unit within the power unit may implement the avoidance operation by modifying the application of the mission plan. In some embodiments, the modifications for the avoidance operation may rely on the connection profile to adjust implement operations as well as power unit movement operations.

Most of the equipment discussed above comprises hardware and associated software. For example, the typical working machine is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

The invention being thus described and further described in the claims, it will be obvious that the same may be varied in many ways. Such variations are not to be regarded as a departure from the spirit and scope of the invention, and all such modifications as would be obvious to one skilled in the art are intended to be included within the scope of the apparatus described.

The invention claimed is:

1. An automated machine system, comprising:
a power unit, comprising:
a mobility system including a steering system and a propulsion system, an implement connection system including a hitch and a power output;
a control unit comprising a control unit processor and a control unit memory, which stores a power unit profile, a connection profile and a mission plan,
a machine actuator system having a steering control, a speed control and a power output control, and
an automation sensor;
an implement, comprising an implement connection system including a hitch frame;
wherein the mission plan includes a path plan, power unit operation instructions and implement operation instructions;
wherein the connection profile includes modifications for the power unit operation instructions and wherein the connection profile also includes implement operation translations, which convert the implement operation instructions into operation instructions for the power unit to run the implement;
wherein the control unit processor executes the mission plan using the power unit profile and the connection profile, wherein, when the control unit identifies one of the power unit operation instructions from the mission plan and determines that the connection profile includes a corresponding implement modification, the control unit modifies the power unit operation instruction based on a corresponding one of the modifications for the power unit operation instruction and executes a modified power unit operation, and
wherein, when the control unit identifies one of the implement operation instructions, the control unit applies a corresponding one of the implement operation translations and executes a corresponding one of the operation instructions for the power unit.

2. The automated machine system according to claim 1, wherein the connection profile is received from a networked server system over a communication network, and wherein the connection profile was generated based on analysis of the power unit profile and an implement profile corresponding to characteristics and features of the implement.

3. The automated machine system according to claim 1, wherein the power unit is selected from a plurality of power units and the implement is selected from a plurality of implements.

4. The automated machine system according to claim 1, wherein the implement connection system includes a power intake that connects to the power output of the power unit.

5. The automated machine system according to claim 1, wherein the implement includes onboard controls, and the connection profile includes control instructions for the power unit to communicate with the implement.

6. The automated machine system according to claim 1, wherein the control unit generates integrated telematics data based on the connection profile.

7. An automation management system for machine systems, comprising:
a networked server system comprising:
a server communication card configured to communicate over a communication network,
a server memory drive, and
a server controller operatively connected to the server communication card and the server memory drive, the server controller is configured to manage the server memory drive and communication over the server communication card;
a machine system comprising:
a power unit selected from one of a plurality of power units, wherein each power unit comprises:
a mobility system including a steering system and a propulsion system,
an implement connection system including a hitch and a power output;
a control unit comprising a control unit processor and a control unit memory, which stores a power unit profile, a connection profile and a mission plan,
a machine actuator system having a steering control, a speed control and a power output control, and
an automation sensor;
an implement selected from a plurality of implements, wherein each implement comprises an implement connection system including a hitch frame;
wherein the networked server includes a mission planning system operated by the server controller in communication with the server memory drive, wherein the mission planning system receives a mission request having an operational zone and identified performance activity, wherein the mission planning system also receives a selection of the power unit and the implement;
wherein the server controller operates the mission planning system to generate a mission plan from the mission request, the power unit and the implement, along with a connection profile for the machine system comprising the power unit attached to the implement, wherein the mission plan includes a path plan and an implement operation; and
wherein the mission plan is loadable into the control unit for the power unit and executable by the control unit using modification information and translation information in the connection profile.

8. The automation management system according to claim 7, wherein the networked server includes a profile generation system operated by the server controller in communication with the server memory drive, wherein the profile generation system receives and analyzes a power unit profile and an implement profile to determine the modification information for power unit operations and the translation information to convert the implement operation into a power unit operation to drive the implement operation.

9. The automation management system according to claim 7, wherein the machine system includes an obstacle avoidance system comprising at least one sensor, wherein the obstacle avoidance system identifies an obstacle based on a signal from the at least one sensor and determines an avoidance operation for the machine system, and wherein the control unit modifies application of the mission plan based on the avoidance operation.

10. The automation management system according to claim 7, wherein the implement connection system includes a power intake that connects to the power output of the power unit.

11. The automation management system according to claim 7, wherein the implement includes onboard controls, and the connection profile includes control instructions for the power unit to communicate with the implement.

12. The automation management system according to claim 7, wherein the networked server system receives integrated telematics data from the power unit, wherein the control unit generates the integrated telematics data based on the connection profile.

* * * * *